May 12, 1931.  G. W. SUNDBERG ET AL  1,804,848
PISTON OIL SAVING RING
Filed July 8, 1920
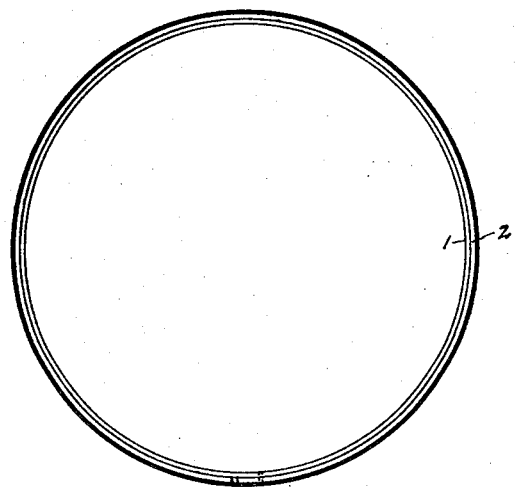
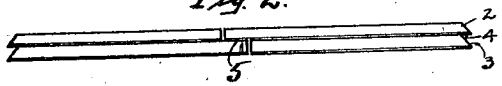

Patented May 12, 1931

1,804,848

UNITED STATES PATENT OFFICE

GUSTAF W. SUNDBERG AND LEWIS J. EDMUNDS, OF LOS ANGELES, CALIFORNIA

PISTON OIL SAVING RING

Application filed July 8, 1920. Serial No. 394,798.

Our invention relates to an oil saving ring for the piston of an internal combustion engine and has for its principal object to provide a ring whose chief function is to wipe the oil from the cylinder wall downwardly with each stroke of the piston. It is different from what is commonly known as a piston ring and performs a different function. It is used in connection with piston rings, that is, our oil saving ring is placed in the lower ring groove of a piston, with the usual piston or compression rings in the upper grooves of the piston. It is not intended that our ring shall act as a sealing ring, as does the usual piston ring, but that it shall operate something on the principal of a hoe or rake which is pushed over the matter to be drawn in and then as it is drawn forward, brings the matter with it. Our ring is provided with a beveled upper, outer corner or edge and has a square lower, outer edge which wipes or scrapes the oil downwardly on the cylinder wall.

In order to fully explain our oil saving ring, we have shown one practical form thereof on the accompanying sheet of drawings, in which, Figure 1 is a top plan view of a ring embodying our invention;

Figure 2 is an edge view thereof; and

Figure 3 is an enlarged sectional view thereof with a small section of the cylinder wall indicated at C.

Referring now to the ring proper, 1, we have shown a form of the ring having two beveled surfaces, 2 and 3, providing a groove, 4, therebetween, as indicated. It will be noticed that the beveled portions are on the upper sides, and that two square contacting edges are provided for contact with the cylinder wall, C, as indicated, with the groove 4, therebetween, thus providing two wiping edges thereon.

The ring here shown is a split ring, having the overlapping meeting ends, as at 5, the circumferential division being on the line between the upper and the lower beveled portions, as clearly indicated.

Thus we have provided a special ring to be used in combination with piston rings, our ring operating as an oil saving ring by passing over the film or coating of oil on the cylinder wall on its upward stroke and wiping the oil downwardly into the crank casing with each downward stroke of the piston.

We are aware that changes can be made in the ring as here illustrated without departing from the spirit of our invention, and we do not, therefore, limit the invention to the exact form shown, except as we may be limited by the hereto appended claim.

We claim:

The combination with the usual cylinder, its cooperating piston, and compression packing and sealing rings, of an oil saving ring having a split, relatively resilient, non-compression, non-sealing body portion provided with a beveled upper outer edge adapted to be easily pushed over oil on the inner surface of a cylinder during the compression stroke of the piston, and two wiping edge portions adapted to bring the oil downwardly with them on the return stroke of the piston, the wiping edge portions being spaced by an upwardly and inwardly inclined wall of the lower wiping portion connecting the same with the bottom of the upper wiping portion, and the two wiping portions being normally projected to the same extent from the body portion to present the wiping edges in the same plane with reference to the surface of the cylinder so that both wiping edges operate in the same manner at all times with reference to the inner surface of the cylinder.

Signed at Los Angeles, Los Angeles County, California, this 2nd day of July, 1920.

GUSTAF W. SUNBERG.
LEWIS J. EDMUNDS.

CERTIFICATE OF CORRECTION.

Patent No. 1,804,848.  Granted May 12, 1931, to

GUSTAF W. SUNDBERG ET AL.

It is hereby certified that the above numbered patent was erroneously issued to the inventors, said "Sundberg et al.", whereas said patent should have been issued to Sav-Oil Ring Manufacturing Co., a corporation of California, said corporation being assignee of the entire interest in said invention, as shown by the records of assignments in this office; and that the said Letters Patent should be read with this correction therein that the same may conform to the record of the case in the Patent Office.

Signed and sealed this 8th day of December, A. D. 1931.

(Seal)

M. J. Moore,
Acting Commissioner of Patents.